(12) United States Patent
Pishehvar et al.

(10) Patent No.: US 11,996,114 B2
(45) Date of Patent: May 28, 2024

(54) END-TO-END TIME-DOMAIN MULTITASK LEARNING FOR ML-BASED SPEECH ENHANCEMENT

(71) Applicant: Apple Inc., Cupertino, CA (US)

(72) Inventors: Ramin Pishehvar, Los Angeles, CA (US); Ante Jukic, Los Angeles, CA (US); Mehrez Souden, Los Angeles, CA (US); Jason Wung, Santa Clara, CA (US); Feipeng Li, Sunnyvale, CA (US); Joshua D. Atkins, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 309 days.

(21) Appl. No.: 17/321,411

(22) Filed: May 15, 2021

(65) Prior Publication Data
US 2022/0366927 A1    Nov. 17, 2022

(51) Int. Cl.
*G10L 15/16*   (2006.01)
*G06N 20/00*   (2019.01)
*G10L 21/0216*   (2013.01)

(52) U.S. Cl.
CPC .......... *G10L 21/0216* (2013.01); *G06N 20/00* (2019.01); *G10L 15/16* (2013.01); *G10L 2021/02166* (2013.01)

(58) Field of Classification Search
CPC ...... G10L 21/0216; G10L 15/16; G06N 20/00
See application file for complete search history.

(56) References Cited

U.S. PATENT DOCUMENTS

| 8,442,820 B2 | 5/2013 | Kim et al. |
| 2011/0164141 A1 | 7/2011 | Tico et al. |
| 2015/0058004 A1 | 2/2015 | Dimitriadis et al. |

(Continued)

FOREIGN PATENT DOCUMENTS

CN        111816180 A        10/2020

OTHER PUBLICATIONS

Luo et al., "Conv-TasNet: Surpassing Ideal Time-Frequency Magnitude Masking for Speech Separation", IEEE/ACM Transactions on Audio, Speech, and Language Processing, vol. 27, No. 8, Aug. 2019, pp. 1256-1266.

(Continued)

*Primary Examiner* — Rasha S Al Aubaidi
(74) *Attorney, Agent, or Firm* — Aikin & Gallant, LLP

(57) ABSTRACT

Disclosed is a multi-task machine learning model such as a time-domain deep neural network (DNN) that jointly generate an enhanced target speech signal and target audio parameters from a mixed signal of target speech and interference signal. The DNN may encode the mixed signal, determine masks used to jointly estimate the target signal and the target audio parameters based on the encoded mixed signal, apply the mask to separate the target speech from the interference signal to jointly estimate the target signal and the target audio parameters, and decode the masked features to enhance the target speech signal and to estimate the target audio parameters. The target audio parameters may include a voice activity detection (VAD) flag of the target speech.

(Continued)

The DNN may leverage multi-channel audio signal and multi-modal signals such as video signals of the target speaker to improve the robustness of the enhanced target speech signal.

20 Claims, 7 Drawing Sheets

(56) References Cited

U.S. PATENT DOCUMENTS

| | | |
|---|---|---|
| 2015/0095026 A1 | 4/2015 | Bisani et al. |
| 2015/0154981 A1 | 6/2015 | Barreda et al. |
| 2017/0270919 A1 | 9/2017 | Parthasarathi et al. |
| 2022/0291328 A1* | 9/2022 | Ozturk .................... G01S 13/56 |

OTHER PUBLICATIONS

E. Tzinis et al., "Sudo rm-rf: Efficient Networks for Universal Audio Source Separation", 2020 IEEE 30th International Workshop on Machine Learning for Signal Processing (MLSP) Sep. 21-24, 2020.

R. Giri, "Attention Wave U-Net for Speech Enhancement", 2019 IEEE Workshop on Applications of Signal Processing to Audio and Acoustics, Oct. 20-23, 2019.

U.S. Appl. No. 16/578,802, filed Sep. 23, 2019, Pishehvar et al.

Ariav et al., "An End-to-End Multimodal Voice Activity Detection Using WaveNet Encoder and Residual Networks", IEEE Journal of Selected Topics in Signal Processing, vol. 13, No. 2, May 2019, pp. 265-274.

Yoshimura et al., "End-to-End Automatic Speech Recognition Integrated With CTC-Based Voice Activity Detection", 2020 IEEE International Conference on Acoustics, Speech, and Signal Processing, ICASSP 2020—Proceedings, May 2020, pp. 6999-7003.

Gu et al., "Multi-modal Multi-channel Target Speech Separation",IEEE Journal of Selected Topics in Signal Processing, vol. 14, Issue. 3, Mar. 16, 2020, pp. 530-541.

Yu et al., "Audio-visual Multi-channel Recognition of Overlapped Speech", Interspeech, May 18, 2020.

Kashif Ali Siddique, "What is an Encoder/Decoder in Deep Learning?", Quora.com response, Mar. 20, 2018, accessible at <https://www.quora.com/What-is-an-Encoder-Decoder-in-Deep-Learning>.

* cited by examiner

END-TO-END TIME-DOMAIN MULTITASK LEARNING FOR ML-BASED SPEECH ENHANCEMENT

FIELD

This disclosure relates to the field of audio communication including machine-learning techniques for use in consumer electronic devices designed to jointly enhance speech signals and detect audio parameter outputs when the consumer communication devices receive speech or voice commands in the presence of background noise. Other aspects are also described.

BACKGROUND

Consumer electronic devices such as smartphones, desktop computers, laptop computers, laptop computers, intelligent personal assistant devices, etc., receive speech from speakers engaged in conversation during a phone call or video conference call. The devices may also be controlled by users issuing speech commands to the devices. For example, users may issue voice commands to the devices to make phone calls, send messages, play media content, obtain query responses, get news, setup reminders, etc. Speech from a target speaker may be interfered by voice from competing speakers, background noise, artifacts due to the acoustic environment, or the main speaker's own interruptions. For the devices to isolate the speech from the target speaker in telephony or video conference calls or to invoke applications and services to respond accurately and timely to the voice commands, the devices need to suppress interference and improve intelligibility of the speech signals in the noisy environment.

SUMMARY

Users may utter speech or issue voice commands in hands-free operations to smartphones, smart assistant devices, smartwatches, computers or other electronic devices. Speech signals called target speech from a user may be mixed with undesirable sound from the noisy environment. A device may digitally process the mixed signals captured by one or more microphones of the device to enhance the target speech in the presence of noise. The enhance speech signals may be routed to the other speakers engaged in the telephony or video conference calls or to enable automatic speech recognition (ASR) in an online or offline environment. Robust speech enhancement may be obtained based on machine learning techniques. For example, deep neural networks (DNN) trained to model desirable and undesired signal characteristics of mixed signals may filter or separate target speech from interference signals to generate enhanced target speech signals. The enhanced target speech signals with improved intelligibility may improve the quality of the conversation or be used for ASR in real-time speech applications.

To improve the performance of ASR (e.g., reduce word error rate), speech processing may integrate robust voice activity detection (VAD) function, which detects a speech segment in an audio sequence. VAD may improve speech recognition accuracy by discarding segments of the mixed signal that do not contain speech as well as reducing the computational cost associated with processing non-speech segments. For example, VAD may estimate the end of a voice query from a speaker, referred to as end pointing, to allow the ASR to process the complete query to recognize and interpret the query. VAD may also arise in applications using speech routing, voice prominence detection, speech level estimation, speech context detection, automatic gain control (AGC), etc. For example, VAD may estimate the prominence (e.g., level, duty cycle) of speech from a speaker to dynamically route the speech among multiple speakers in video conferencing applications. The applications may capture the voice commands in a noisy environment of background noise, competing speakers, reverberant signals, etc.

Speech enhancement of target speech and VAD may be performed separately in time or in separate operations. For example, a VAD function may process the enhanced target speech signals generated by the DNN to generate a VAD flag. The video conferencing application or ASR function may operate on the enhanced target speech and the VAD flag. However, to further increase the robustness and quality of the enhanced target speech signal, it is desirable to integrate the VAD and the speech enhancement functions in the DNN model. A DNN model that jointly models the desirable characteristics of the target speech and detects the presence of the target speech from the mixed signal of target speech and interference may force the DNN to learn internal representations that indicate small voice activities during non-speech periods. The joint fine-tuning of the DNN cost function based on such internal representations may lead to lower background noise in the enhanced target speech signal.

Systems and methods are disclosed for a DNN model that uses multi-task learning to jointly generate an enhanced target speech signal and one or more target audio parameters from a mixed signal of target speech and interference signal. The multi-task DNN model may be an end-to-end time-domain multi-task learning framework using a data-driven internal representation to encode the mixed signal, separate the internal representation of the target speech from the interference signal to generate masked features in time-domain, and to decode the masked features to reconstruct the target speech signal and to estimate the target audio parameters. In one aspect, the reconstructed target speech signal may be an enhanced target speech signal that has been de-noised and de-reverberated. In one aspect, the target audio parameters may include a VAD flag to indicate periods of active speech from non-speech segments, directional of arrival (DOA) of the target speech, identification of a source of the target speech, residual echo probability of the target speech, etc. The target audio parameters may be used in the multi-task learning framework or provided as independent outputs from the DNN model with the enhanced target speech signal for processing by subsequent speech processing functions, such as in video conferencing applications or ASR. Advantageously, jointly optimizing the enhanced target speech signal and the one or more target audio parameters improves the robustness of the target speech enhancement technique compared to a DNN model that optimizes the target speech signal alone. It also eliminates the computational complexity, cost, and latency incurred when using additional speech processing blocks following the DNN model to derive the target audio parameters.

In one aspect, the encoder of the multi-task DNN model that maps segments of the mixed signal to internal representations of the mixed signal may be shared between the target speech enhancement function and the target audio parameter estimation function. In one aspect, the separation network may calculate multiplicative weighting functions, also referred to as masks, to multiply with the output from the encoder to filter or mask the target speech signal from the interference signal. In one aspect, the separation network may also be shared between the target speech enhancement function and the target audio parameter estimation function. Because the separation network and the encoder are shared, the internal representations may be optimized to enhance both the filtering of the target speech signal and the estimation of the target audio parameters. In one aspect, the optimized cost function is a weighted sum of the cost function associated with estimating the target audio parameters and enhancing the target speech signal. The shared architecture of the separation network and the encoder also has the advantage of only marginally increasing the computational cost of the multi-task DNN model for accurately estimating the target audio parameters. In one aspect, the DNN model may be trained during supervised deep learning to learn the characteristics of the desired target signal and the target audio parameters.

In one aspect, the multi-task DNN model may process a multi-channel target speech signal, such as target speech captured by a microphone array. The multi-task DNN model may leverage spatial and directional information provided by the multiple microphones to improve the robustness of the enhanced target speech signal. For example, the encoder and separation network may learn the spatial and directional features of the target speech signal and the target audio parameters to improve the filtering of the target speech signal from the interference signal. The target audio parameters may also include a spatial VAD flag, where only target speech from a preferred direction (e.g., front of the device) is considered as active speech.

In one aspect, the multi-task DNN model may process visual signals captured by one or more cameras or other multi-modal signals to further improve the robustness of the enhanced target speech signal. For example, visual information of the target speaker may augment the audio signals to facilitate the encoder and the separation network to better discriminate between the target speech and speech from interfering speakers or background noise. The multi-modal signals may also improve the estimates of the target audio parameters. In one aspect, the multi-modal signals may include DOA information of the target speaker from a camera tracking the target speaker's face, visual signals of the target speaker's lip movements or facial expressions captured by the camera, the target speaker's voice characteristics extracted from utterances by the target speaker captured during an enrollment process, etc.

The time-domain nature of the multi-task DNN model eliminates the need for post-processing blocks such as hangover models or other types of smoothing functions or statistical processing to smooth the transitions between periods of active speech and non-speech, simplifying the tuning and deployment of the target audio parameters such as the VAD flag. The time-domain nature of the VAD estimation also simplifies the estimation of spatial VAD in a multi-channel setup. However, the multi-task DNN model to jointly optimize an enhanced target speech signal and one or more target audio parameters may also be deployed in a non-time-domain network. For example, spectral features of the mixed signal may be estimated using short-term Fourier Transform (STFT) instead of mapping the mixed signal to time-domain representations using the linear encoder of the time-domain DNN model. The separation network may estimate the spectrogram masks of the target speaker at the time-frequency bins to multiply with the spectrogram from the STFT to mask the target speech from the interference signal. An inverse STFT (iSTFT) may transform the masked spectrogram into the time-domain target speech signal and to estimate the target audio parameters.

A method of jointly enhancing a target speech signal and estimating a target audio parameter from a mixed signal of the target speech signal and interference using a DNN model is disclosed. The method includes the DNN model encoding an audio signal that includes the target speech signal and interference signals into an internal representation for machine learning. The method also includes the DNN model determining masks used to jointly estimate the target speech signal and the target audio parameter based on the internal representation. The method further includes the DNN model applying the masks to the internal representation to jointly estimate or infer the target speech signal and the target audio parameter. The DNN model may jointly optimize the cost function of estimating the target speech signal and the target audio parameter. The method further includes the DNN decoding the inferred target speech signal and the inferred target audio parameter to generate an enhanced target speech signal and a target audio parameter output.

A method of jointly enhancing a target speech signal and detecting active speech from multi-channel audio signals and multi-modal signals using a DNN model is disclosed. The method includes the DNN model receiving the multi-channel audio signals that include the target speech signal overlapped with interference signals and the multi-modal signals that contain information of a source of the target speech signal. The method also includes the DNN model encoding the multi-channel audio signals and the multi-modal signals into an internal representation of the input signals for machine learning. The method further includes the DNN model determining masks used to jointly estimate the target speech signal and to detect voice activity based on the internal representation. The method further includes the DNN model applying the masks to the internal representation to generate masked features to separate the target speech signal from the interference signals. The masked features may jointly infer the target speech signal and detected voice activity. The DNN model may jointly optimize the cost function of estimating the target speech signal and the estimating the voice activity detection. The method further includes the DNN decoding the masked features to generate an enhanced target speech signal and VAD of the enhanced target speech signal.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
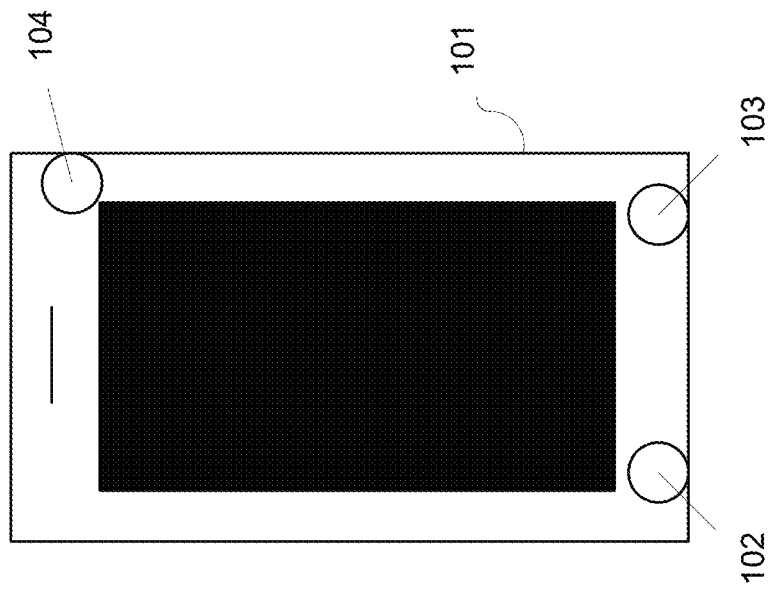
FIG. 1 depicts a scenario of a user issuing a voice command to a smartphone for the smartphone to detect the voice command according to one aspect of the disclosure.
Figure 1:
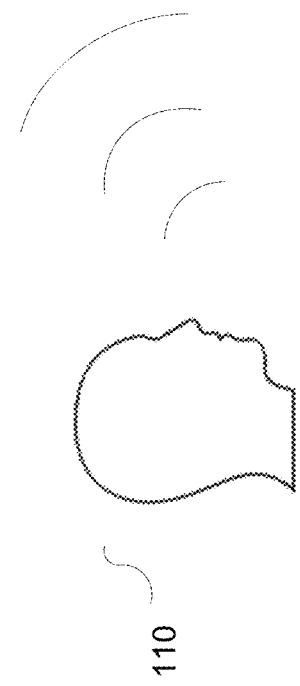

When devices such as smartphones or intelligent personal assistant devices receive speech, voice commands, or user queries, collectively referred to as target speech, machine learning speech enhancement techniques implemented in DNN models may be used to improve the intelligibility of the target speech in the presence of noise. The DNN models may be trained to remove noise and reverberation from the target speech to enhance the target speech for subsequent audio processing such as speech routing in telephony or video conferencing applications or to recognize and interpret the target speech in voice command applications. It is also desirable for the devices to distinguish between periods of active speech and non-speech in the target speech to determine the starting point, brief pauses, and end point of an utterance from a target speaker. Such indication of voice activity detection (VAD) as well as other audio parameters such as directional of arrival (DOA) or residual echo probability of the target speech, identification of the target speaker, etc., may be used to improve the robustness of the DNN-based speech enhancement techniques in the noisy environment. For example, small voice activity inferred during non-speech periods may be used to lower background noise in the enhanced target speech signal.

Systems and methods are disclosed for a time-domain multi-task machine learning model to jointly learn enhanced target speech signal and one or more target audio parameters such as VAD from a mixed signal of target speech and interference signal. Joint learning of the enhanced target speech signal and the target audio parameters and jointly optimizing the cost function associated with inferring the target speech signal and the target audio parameters increases the robustness of the enhanced target speech signal to background noise. For example, the multi-task machine learning model may use the additional constraints of the VAD, DOA, target speaker identification, residual echo probability, etc., to improve the inference of the target speech signal. The multi-task machine learning model may also enhance the inference of the target audio parameters. The time-domain nature of the multi-task machine learning model eliminates the need for post-processing blocks such as hangover models or other types of smoothing functions or statistical processing to smooth the transitions between periods of active speech and non-speech, simplifying the tuning and deployment of the target audio parameters such as the VAD flag.

In one aspect, the time-domain multi-task machine learning model may include an encoder module to map the mixed signal of target speech and interference signal to a high-dimensional internal representation using encoder basis functions. A separation module may operate on such internal representation to calculate multiplicative weighting functions used to filter or mask the target speech signal from the interference signal. The output from the encoder module may be multiplied with the multiplicative weighting functions to generate masked features that jointly infer the target speech signal and the target audio parameters. A decoder module for target speech enhancement may reconstruct the enhanced target speech signal from the masked features. A decoder module for target audio parameters may reconstruct the target audio parameters from the masked features. The encoder module and the separation module may be shared between the target speech enhancement function and the target audio parameter estimation function, resulting in only a small additional computational cost for generating the audio parameters.

In one aspect, the target audio parameters may be provided as independent outputs for processing by subsequent audio processing functions, thus eliminating the need to separately generate the target audio parameters by the other audio processing functions. For example, VAD may be output as an estimate of the prominence (e.g., level, duty cycle) of the target speech to dynamically route the target speech among multiple speakers or to disable the routing of audio and video signals from non-active speakers in video conferencing applications. The time-domain nature of the target audio parameter inference also simplifies its deployment in a multi-channel setup such as when capturing the target speech using a microphone array. For example, the multi-task machine learning model may infer a spatial VAD such that only target speech from a preferred direction is considered as active speech.

In one aspect, the multi-task machine learning model may leverage spatial and directional information provided by the multiple microphones of the microphone array to improve the robustness of the enhanced target speech signal and the target audio parameters. In one aspect, the multi-task machine learning model may process visual signals captured by one or more cameras or other multi-modal signals to further improve the robustness of the enhanced target speech signal and the target audio parameters against interfering speakers or background noise. In one aspect, the multi-modal signals may include DOA information of the target speaker provided by a camera that tracks the target speaker's face, visual signals of the target speaker's lip movements or facial expressions captured by the camera, the target speaker's voice characteristics extracted from utterances by the target speaker captured during an enrollment process, etc.

In the following description, numerous specific details are set forth. However, it is understood that aspects of the disclosure here may be practiced without these specific details. In other instances, well-known circuits, structures and techniques have not been shown in detail in order not to obscure the understanding of this description.

The terminology used herein is for the purpose of describing particular aspects only and is not intended to be limiting of the disclosure. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and "comprising" specify the presence of stated features, steps, operations, elements, or components, but do not preclude the presence or addition of one or more other features, steps, operations, elements, components, or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

FIG. 1 depicts a scenario of a user uttering speech during a telephony or video conferencing call or issuing a voice command to a smartphone for the smartphone to detect the voice command according to one aspect of the disclosure. The smartphone 101 may include three microphones 102, 103, and 104 located at various locations on the smartphone 101. The microphones 102, 103, and 104 may form a compact microphone array to capture speech signals from the user 110. As an example, the user 110 may utter a query keyword such as "Hey Siri" followed by the query "What time is it?" to request the current time from a smart assistant application. The smartphone 101 may divide the speech signals captured by the microphones into frames and may transmit the audio data frames to a multi-task machine learning model running on the smartphone 101 or on a remote server. The target speech signals may be mixed with undesirable sound from the noisy environment The multi-task machine learning model may be trained to model desirable and undesired signal characteristics of the mixed signals to filter or separate the target speech signal from interference signals to generate enhanced target speech signals. The multi-task machine learning model may also be trained to estimate target audio parameters such as VAD. The enhanced target speech signals and optionally the target audio parameters may be provided to telephony or video conferencing applications to improve the user experience during the conversation or to automatic speech recognition applications to identify and interpret the voice command or query.

Figure 2:
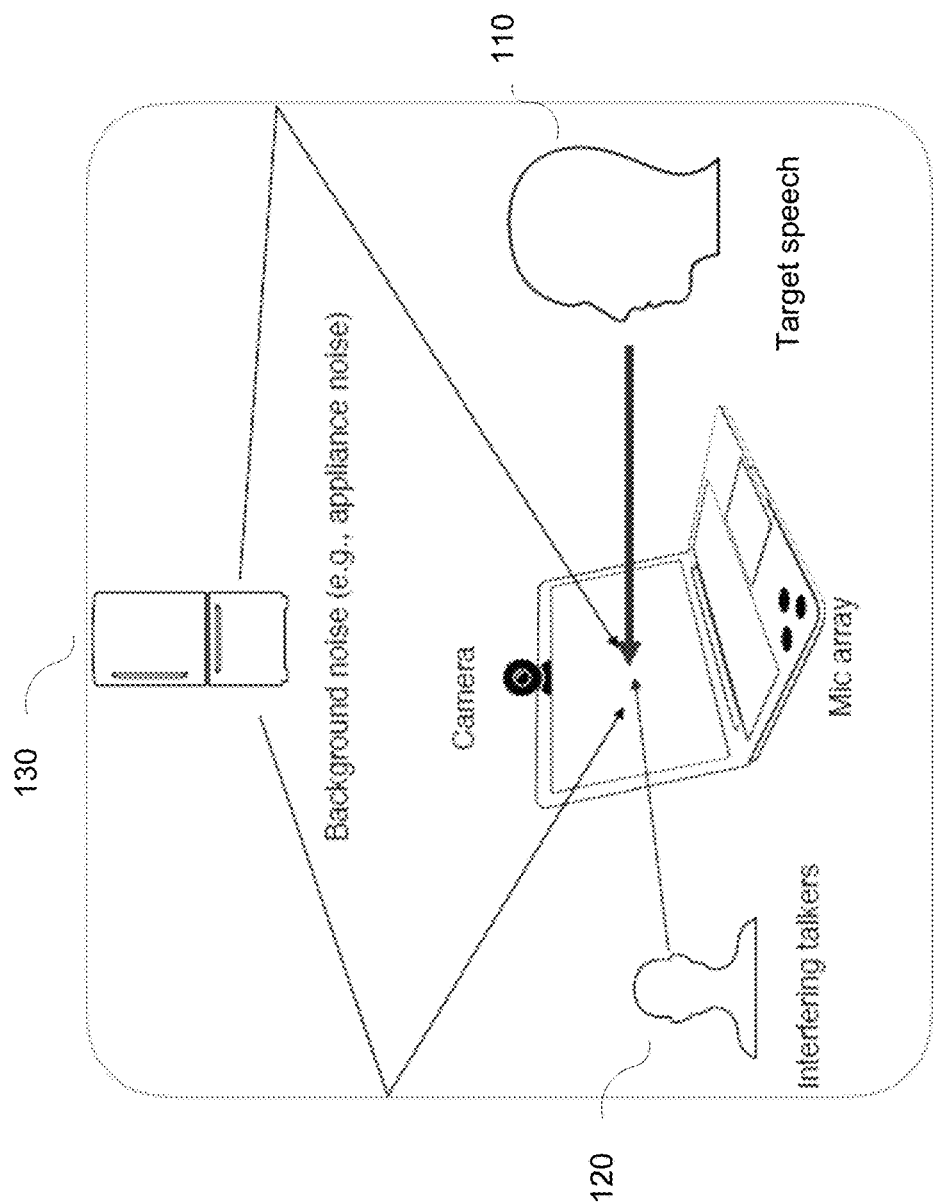
FIG. 2 depicts a scenario of an electronic device receiving multi-modal signals including target speech and video signals from a target speaker in the presence of interfering talkers and background noise according to one aspect of the disclosure.

FIG. 2 depicts a scenario of an electronic device receiving multi-modal signals including target speech and video signals from a target speaker in the presence of interfering talkers and background noise according to one aspect of the disclosure. The electronic device such as the laptop computer may have a microphone array to capture the target speech from the target speaker. The target speech may be interfered by voice from interfering talker 120 and background noise 130 such as appliance noise.

The electronic device may also have a camera to capture images or videos of the target speaker. Visual information of the target speaker provided by the camera may augment the audio signals captured by the microphone array to facilitate the multi-task machine learning model to better discriminate between the target speech and the interfering talker 120 or the background noise 130. In one aspect, the visual information may include DOA information of the target speaker from the camera tracking the target speaker's face, visual signals of the target speaker's lip movements or facial expressions, etc. Using the multi-modal information provided by the microphone array and the camera, the multi-task machine learning model may infer the target speech when there are multiple speakers or noise sources. The visual information not only helps the multi-task machine learning model to identify the target speaker, it also provides additional cues for speech extraction to improve the inference of the target audio parameters.

Figure 3:
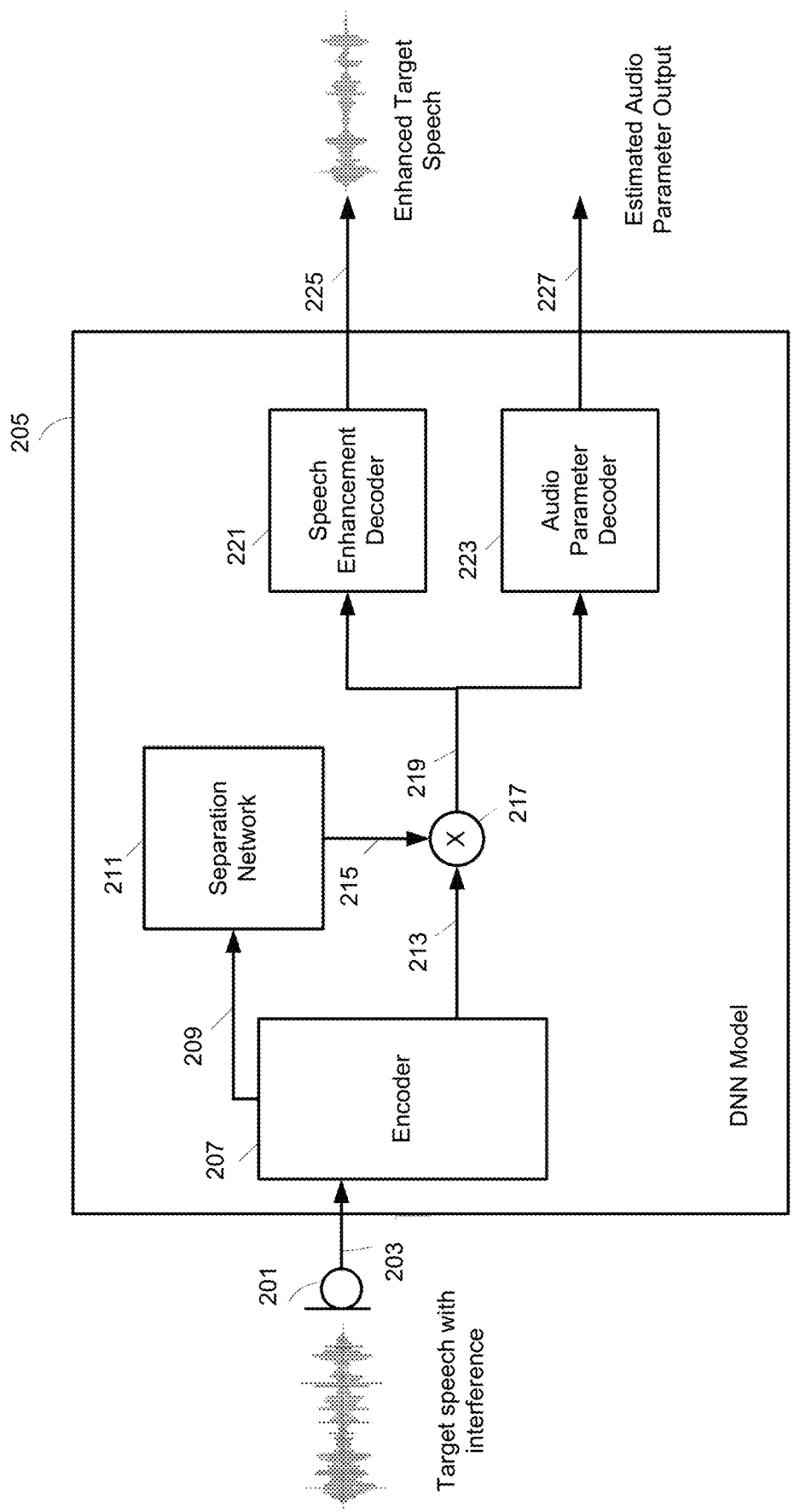
FIG. 3 is a block diagram of a machine learning model that uses multi-task learning to jointly generate an enhanced target speech signal and one or more target audio parameters from a mixed signal of target speech and interference signal according to one aspect of the disclosure.

FIG. 3 is a block diagram of a machine learning model 205 that uses multi-task learning to jointly generate an enhanced target speech signal 225 and one or more target audio parameters 227 from a mixed signal 203 of target speech and interference signal according to one aspect of the disclosure. The machine learning model 205 may be an end-to-end time-domain multi-task learning framework that uses a data-driven internal representation to encode the mixed signal 203, separate the internal representation of the target speech from the interference signal to generate masked features in time-domain, and to decode the masked features to reconstruct the target speech signal to generate the enhanced target speech signal 225 and to estimate the target audio parameters 227.

A microphone 201 may capture the target speech and interference signal to generate the mixed signal 203. The target speech may be overlapped with interference signal such as voice from competing speakers (e.g., 120 of FIG. 2), background noise (e.g., 130 of FIG. 2), artifacts due to the acoustic environment such as reverberant signals, the main speaker's own interruptions, etc.

An encoder module 207 may transform short segments of the mixed signal 203 of target speech and interference signal into their corresponding representations in an intermediate feature space. For example, encoder module 207 may map segments of the mixed signal 203 to a high-dimensional internal representation 209 using encoder basis functions. The encoder module 207 may be shared between the target speech enhancement function and the target audio parameter estimation function. In one aspect, encoder module 207 may be implemented by a convolutional operation of the mixed signal 203 with the encoder basis functions followed by a linear function or a nonlinear function such as a rectified linear unit (ReLU). In one aspect, if the machine learning model 205 is a non-time-domain network, encoder module 207 may extract spectral features of the mixed signal 203 using short-term Fourier Transform (STFT).

A separation network 211 may operate on the internal representation 209 from encoder module 207 to calculate multiplicative weighting functions, also referred to as masks 215, used to filter or mask the target speech signal from the interference signal. The separation network 211 may also be shared between the target speech enhancement function and the target audio parameter estimation function. Because separation network 211 and encoder module 207 are shared, the internal representations of mixed signal 203 may be optimized to enhance both the filtering of the target speech signal and the estimation of the target audio parameters. In one aspect, the optimized cost function may be a weighted sum of the cost function associated with estimating the target audio parameters and enhancing the target speech signal. In one aspect, separation network 211 may be implemented by stacked convolutional blocks. In one aspect, if the machine learning model 205 is a non-time-domain network, separation network 211 may estimate the spectrogram masks of the target speech at the time-frequency bins to multiply with the spectrogram from the STFT to mask the target speech from the interference signal.

A multiplier module 217 may multiply an internal representation 213 of mixed signal 203 from encoder module 207 by masks 215 generated by separation network 211 to generate masked features 219. The masked features 219 may filter or mask features of the target speech signal from the interference signal in the time domain to jointly infer the target speech signal and the target audio parameters. The internal representation 213 of features multiplied by the masks 215 to generate masked features 219 may be the same or different from the internal representation 209 of features used to generate masks 215. In one aspect, if the machine learning model 205 is a non-time-domain network, multiplier module 217 may multiply the spectrogram from the STFT by the spectrogram masks to generate masked spectrogram.

A speech enhancement decoder 221 may reconstruct enhanced target speech signal 225 from masked features 219. The speech enhancement decoder 221 may transform masked features 219 from the internal feature space of machine learning model 205 back to the time domain. In one aspect, speech enhancement decoder 221 may be implemented by a convolutional operation transposed to the convolutional operation in encoder module 207. In one aspect, if the machine learning model 205 is a non-time-domain network, an inverse STFT (iSTFT) may transform the masked spectrogram into the time-domain enhanced target speech signal 225.

An audio parameter decoder 223 may reconstruct the target audio parameters 227 from masked features 219. The target audio parameters 227 may include a VAD flag to indicate periods of active speech from non-speech segments, directional of arrival (DOA) of the target speech, identification of a source of the target speech, residual echo probability of the target speech, etc. The target audio parameters 227 may be provided as an independent output from machine learning model 205 for processing by subsequent speech processing functions such as in video conferencing applications or ASR.

Advantageously, jointly optimizing enhanced target speech signal 225 and target audio parameters 227 by the multi-task machine learning model 205 improves the robustness of the target speech enhancement technique compared to a machine learning model that optimizes the target speech signal alone. It also eliminates the computational complexity, cost, and latency incurred when using additional speech processing blocks following the DNN model to derive target audio parameters 227.

Figure 4:
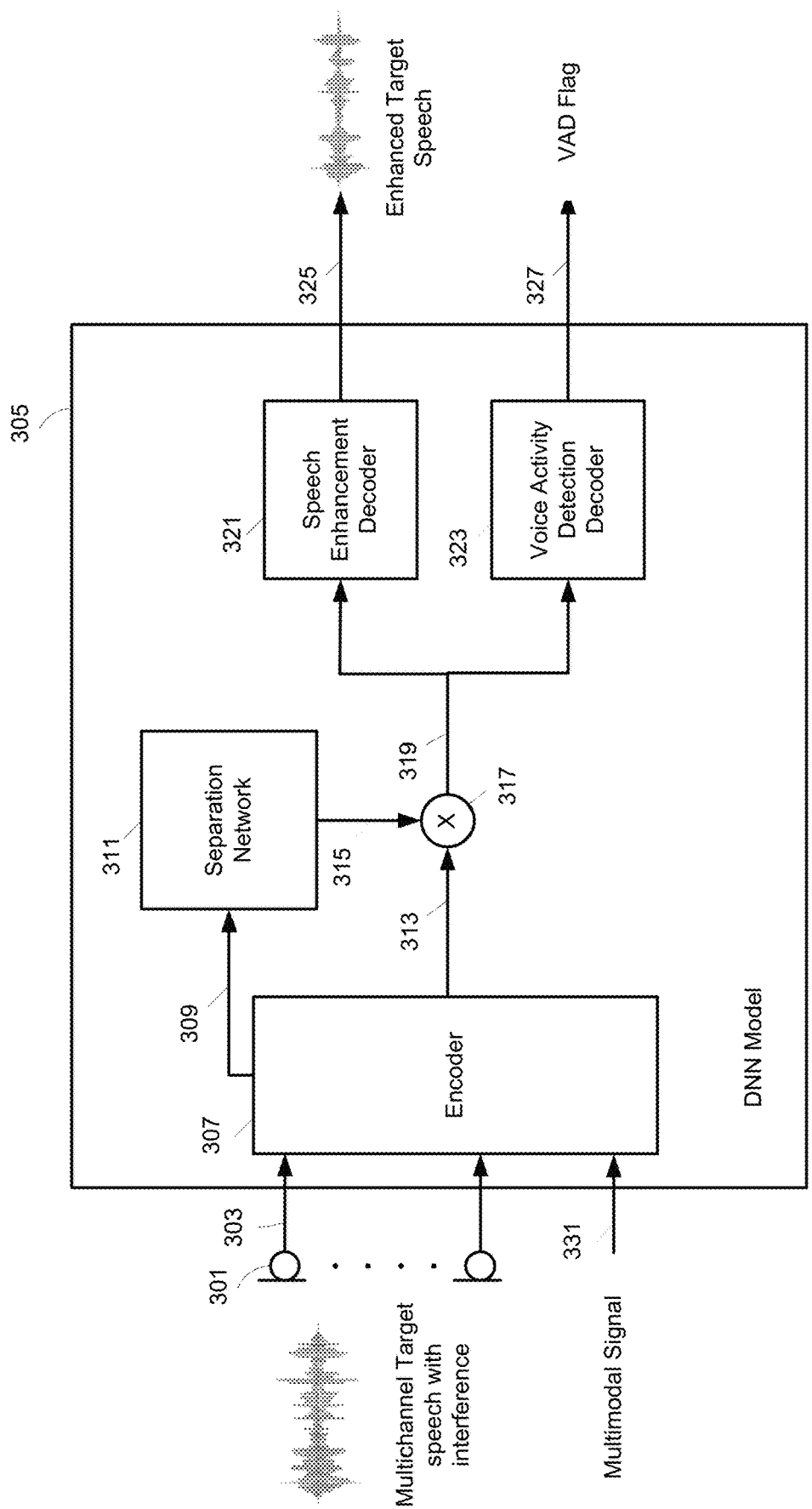
FIG. 4 is a block diagram of a machine learning model that uses multi-task learning to jointly generate an enhanced target speech signal and a VAD flag from a multi-channel signal of target speech and interference signal captured by a microphone array and multi-modal signals according to one aspect of the disclosure.

FIG. 4 is a block diagram of a machine learning model 305 that uses multi-task learning to jointly generate an enhanced target speech signal 325 and a VAD flag 327 from a multi-channel signal 303 of target speech and interference signal captured by a microphone array 301 and multimodal signals 331 according to one aspect of the disclosure.

The machine learning model 305 may leverage spatial and directional information provided by multi-channel signal 303 of the microphone array 301 to improve the robustness of enhanced target speech signal. 325. For example, the encoder and separation network may learn the spatial and directional features of the target speech signal to improve the filtering of the target speech signal from the interference signal. The VAD flag 327 may be a spatial VAD flag where only target speech from a preferred direction (e.g., front of the device) is considered as active speech.

The machine learning model 305 may further leverage multi-modal signals 331 to further improve the robustness of enhanced target speech signal 325. For example, visual information of the target speaker provided by a camera may augment the audio information provided by multi-channel signal 303 to facilitate the encoder and the separation network to better discriminate between the target speech and speech from interfering speakers or background noise. The multi-modal signals 331 may also improve the estimates of the VAD. In one aspect, multi-modal signals 331 may include DOA information of the target speaker from a camera tracking the target speaker's face, visual signals of the target speaker's lip movements or facial expressions captured by the camera, the target speaker's voice characteristics extracted from utterances by the target speaker captured during an enrollment process, etc.

An encoder module 307 may map segments of multi-channel signal 303 and segments of multi-modal signals 331 to high-dimensional internal representations using encoder basis functions. The mapped features of multi-channel signal 303 and multi-modal signals 331 may be fused to generate fused feature space 309. The encoder module 307 may be shared between the target speech enhancement function and the VAD estimation function.

A separation network 311 may operate on fused feature space 309 from encoder module 307 to calculate multiplicative weighting functions, also referred to as masks 315, used to filter or mask the target speech signal from the interference signal. The separation network 311 may also be shared between the target speech enhancement function and the VAD estimation function. Because separation network 311 and encoder module 307 are shared, the internal representations of multi-channel signal 303 and multi-modal signals 331 may be optimized to enhance both the filtering of the target speech signal and the estimation of the VAD. In one aspect, the optimized cost function may be a weighted sum of the cost function associated with enhancing the target speech signal and estimating the VAD.

A multiplier module 317 may multiply mapped features 313 of multi-channel signal 303 from encoder module 307 by masks 315 generated by separation network 311 to generate masked features 319. The masked features 310 may filter or mask features of the target speech signal from the interference signal in the time domain to jointly infer the target speech signal and the VAD.

A speech enhancement decoder 321 may reconstruct enhanced target speech signal 325 from masked features 319. The speech enhancement decoder 321 may transform masked features 319 from the internal feature space of machine learning model 305 back to the time domain.

A VAD decoder 323 may reconstruct VAD flag 327 from masked features 319. The target audio parameters 227 may be provided as an independent output from machine learning model 205 for processing by subsequent speech processing functions. For example, VAD flag 327 may be provided to functions employing speech routing, voice prominence detection, speech level estimation, speech context detection, automatic gain control (AGC), etc. For example, VAD flag 327 may estimate the prominence (e.g., level, duty cycle) of speech from a speaker to dynamically route the speech among multiple speakers or to disable the routing of audio and video signals from non-active speakers in video conferencing applications. Because machine learning model 305 leverages multi-channel signal 303 and multi-modal signals 331 to generate fused feature space 309, VAD flag 327 may be inferred using both audio and video information.

Figure 5:
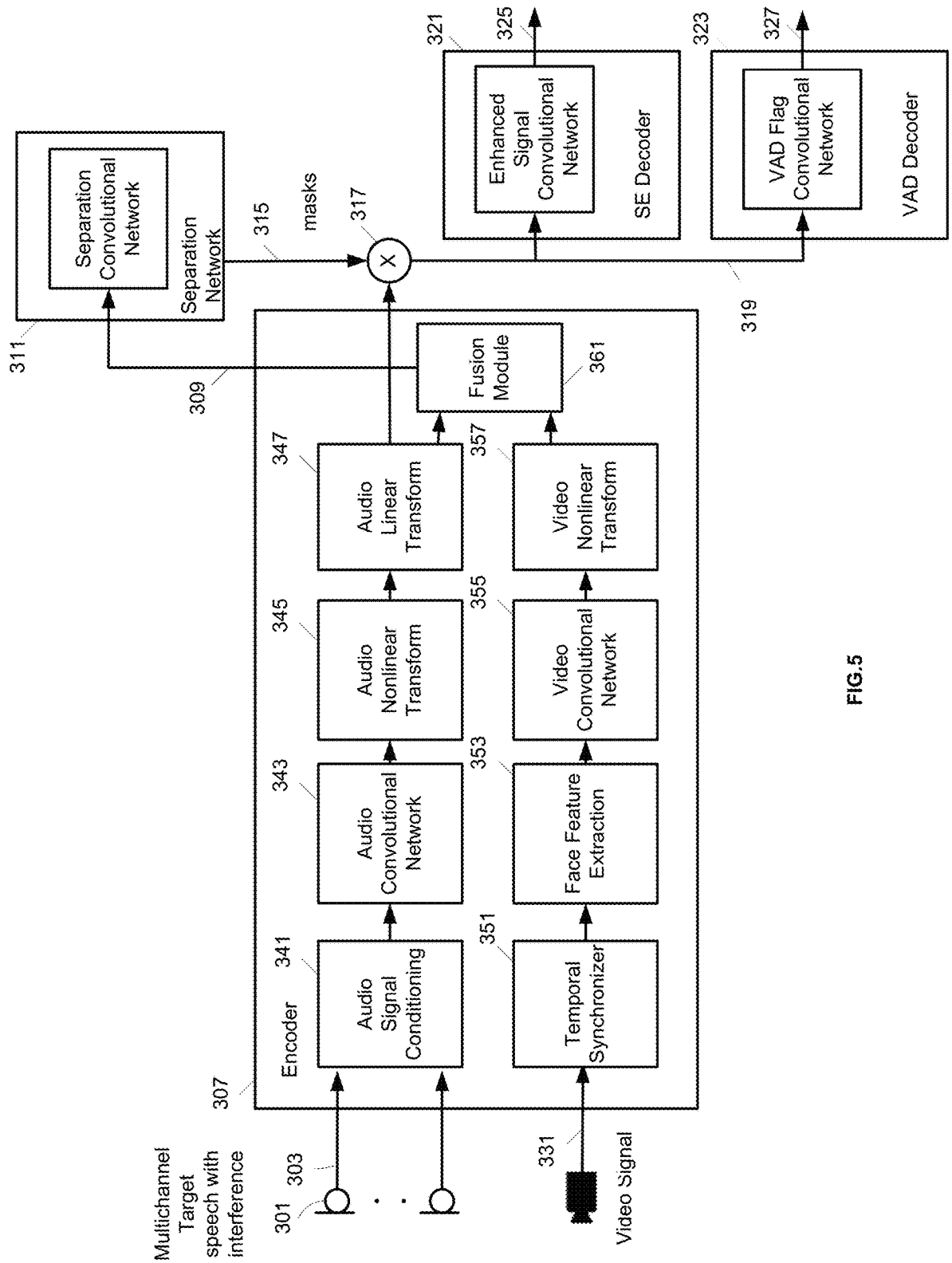
FIG. 5 is a more detailed block diagram of a multi-task machine learning model that jointly generate an enhanced target speech signal and a VAD flag from a multi-channel signal of target speech and interference signal captured by a microphone array and multi-modal signals according to one aspect of the disclosure.

FIG. 5 is a more detailed block diagram of the multi-task machine learning model 305 of FIG. 4 that jointly generate the enhanced target speech signal 325 and the VAD flag 327 from a multi-channel signal 303 of target speech and interference signal captured by a microphone array 301 and video signals 331 captured by a camera according to one aspect of the disclosure.

Encoder module 307 may include an audio encoding path and a video encoding path. The audio encoding path may include an audio signal conditioning module 341 to adjust the input level of multi-channel signal 303. An audio convolutional network 343 may contain a series of convolutional filters across time and channels to transform the conditioned multi-channel signal to an internal representation using encoder basis functions. An audio nonlinear transform module 345 and an audio linear transform module 347 may process the internal representation to create outputs corresponding to a learned mapped feature representation of multi-channel signal 303. The learned mapped feature representation may jointly encode spectral, temporal, or spatial information of multi-channel signal 303. The audio encoding path may be shared between the target speech enhancement function and the VAD estimation function.

The video encoding path may include a temporal synchronizer module 351 to time synchronize the audio stream of multi-channel signal 303 with video signal 331 so that a particular segment of the target speech corresponds to visual images of the target speaker captured by video signal 331. A face feature extraction module 353 may extract relevant features from the face of the target speaker such as lip movements, facial expression, etc., from the synchronized video signal 331. A video convolutional network 355 may contain a series of convolutional filters to transform the extracted facial features of the target speaker to an internal representation using encoder basis functions. A video nonlinear transform module 357 may process the internal representation of the extracted facial features to create a learned mapped feature representation. The video encoding path may be shared between the target speech enhancement function and the VAD estimation function.

A fusion module 361 may fuse the mapped feature representations of the audio encoding path and the video encoding path to generated fused feature space 309. In one aspect, the fusion module 365 may generate fused feature space 309 using concatenation, linear mixing, nonlinear mixing, or a combination of these techniques.

The separation module 311 may operate on fused space 309 to calculate masks 315 as discussed before. In one aspect, separation module 311 may be implemented by convolutional networks such as stacked convolutional blocks. The multiplier module 317, speech enhancement decoder 321 and VAD decoder 323 may operate as discussed before to generate enhanced target speech signal 325 and VAD flag 327. In one aspect, speech enhancement decoder 321 and VAD decoder 323 may be implemented using convolutional networks.

Figure 6:
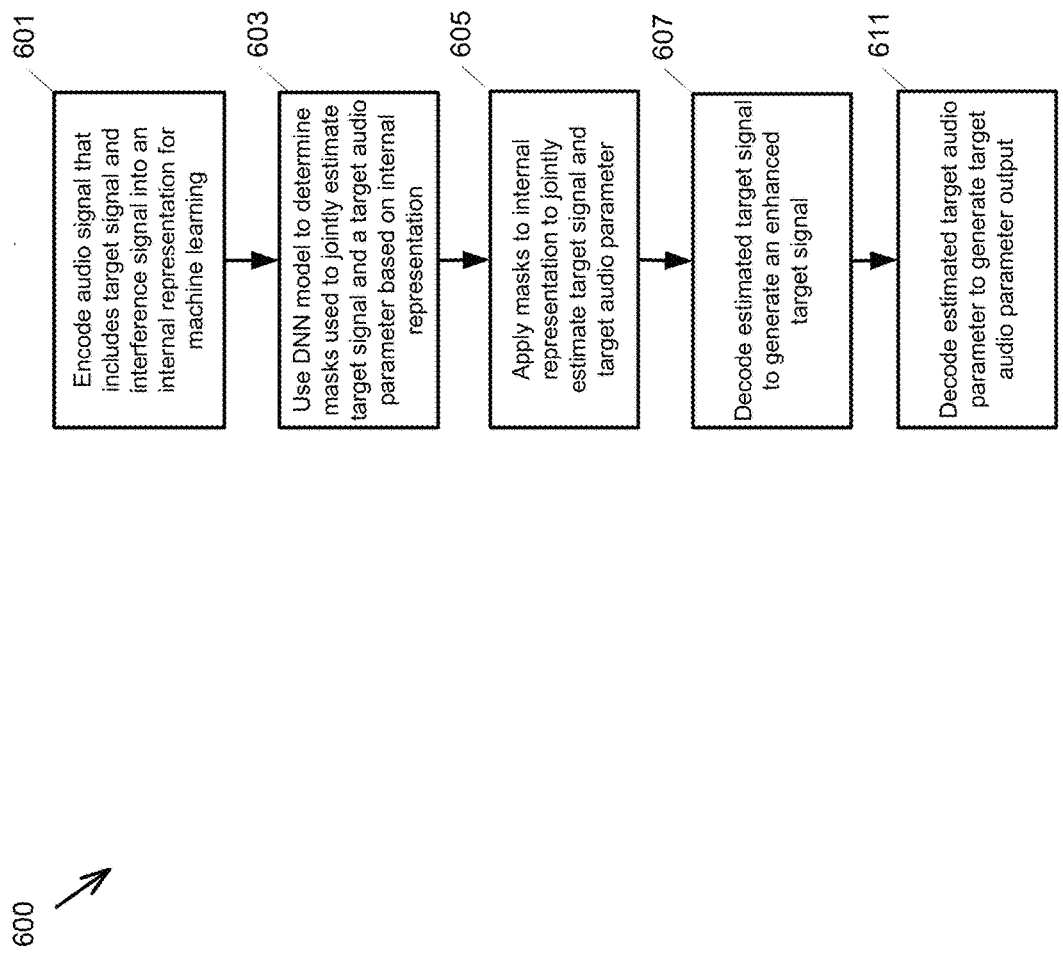
FIG. 6 is a timing diagram of a method for jointly enhancing a target speech signal and estimating a target audio parameter from a mixed signal of target speech signal and interference using a multi-task machine learning model according to one aspect of the disclosure.

FIG. 6 is a timing diagram of a method 600 for jointly enhancing a target speech signal and estimating a target audio parameter from a mixed signal of target speech signal and interference using a multi-task machine learning model according to one aspect of the disclosure. The method 600 may be practiced by the multi-task machine learning model 205 of FIG. 3.

In operation 601, the multi-task machine learning model encodes audio signal that includes the target speech signal and interference signals into an internal representation for machine learning.

In operation 603, the multi-task machine learning model determines masks used to jointly estimate the target speech signal and the target audio parameter based on the internal representation.

In operation 605, the multi-task machine learning model applies the masks to the internal representation to jointly estimate or infer the target speech signal and the target audio parameter. The multi-task machine learning model may jointly optimize the cost function of estimating the target speech signal and the target audio parameter.

In operation 607, the multi-task machine learning model decodes the estimated target speech signal to generate an enhanced target speech signal.

In operation 609, the multi-task machine learning model decodes the estimated target speech signal to generate a target audio parameter output.

Figure 7:
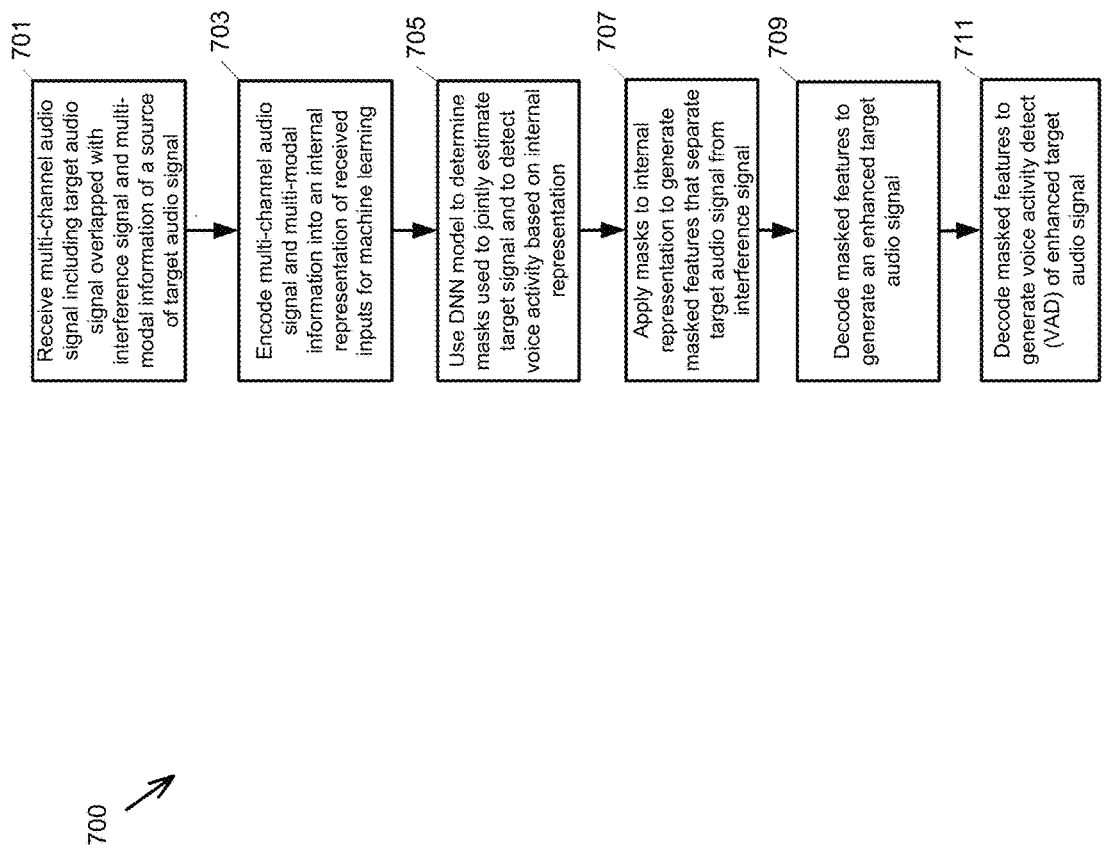
FIG. 7 is a timing diagram of a method for jointly enhancing a target speech signal and estimating a VAD flag to indicate active speech from multi-channel audio signals and multi-modal signals using a multi-task machine learning model according to one aspect of the disclosure.

FIG. 7 is a timing diagram of a method 700 for jointly enhancing a target speech signal and estimating a VAD flag to indicate active speech from multi-channel audio signals and multi-modal signals using a multi-task machine learning model according to one aspect of the disclosure. The method 700 may be practiced by the multi-task machine learning model of FIG. 3 or FIG. 4.

In operation 701, the multi-task machine learning model receives the multi-channel audio signals that include the target speech signal overlapped with interference signals and the multi-modal signals that contain information of a source of the target speech signal.

In operation 703, the multi-task machine learning model encodes the multi-channel audio signals and the multi-modal signals into an internal representation of the input signals for machine learning.

In operation 705, the multi-task machine learning model determines masks used to jointly estimate the target speech signal and to detect voice activity based on the internal representation.

In operation 707, the multi-task machine learning model applies the masks to the internal representation to generate masked features to separate the target speech signal from the interference signals. The masked features may jointly infer the target speech signal and detected voice activity. The DNN model may jointly optimize the cost function of estimating the target speech signal and the estimating the voice activity detection.

In operation 709, the multi-task machine learning model decodes the masked features to generate an enhanced target speech signal.

In operation 711, the multi-task machine learning model decodes the masked features to generate the VAD of the enhanced target speech signal.

Aspects of the deep learning system described herein may be implemented in a data processing system, for example, by a network computer, network server, tablet computer, smartphone, laptop computer, desktop computer, other consumer electronic devices or other data processing systems. In particular, the operations described for the deep learning system are digital signal processing operations performed by a processor that is executing instructions stored in one or more memories. The processor may read the stored instructions from the memories and execute the instructions to perform the operations described. These memories represent examples of machine readable non-transitory storage media that can store or contain computer program instructions which when executed cause a data processing system to perform the one or more methods described herein. The processor may be a processor in a local device such as a smartphone, a processor in a remote server, or a distributed processing system of multiple processors in the local device and remote server with their respective memories containing various parts of the instructions needed to perform the operations described.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain exemplary instances have been described and shown in the accompanying drawings, it is to be understood that these are merely illustrative of and not restrictive on the broad disclosure, and that this disclosure is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

As described above, one aspect of the present technology is the transmission and use of speech or data from specific and legitimate sources to an audio output device. The present disclosure contemplates that in some instances, this speech or data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information. The present disclosure recognizes that the use of such personal information data, in the present technology, can be used to the benefit of users.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates aspects in which users selectively block the use of, or access to, personal information data. That is, the present disclosure contemplates that hardware and/or software elements can be provided to prevent or block access to such personal information data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers the transmission of use of personal information data to implement one or more various disclosed aspects, the present disclosure also contemplates that the various aspects can also be implemented without the need for accessing such personal information data. That is, the various aspects of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

What is claimed is:

1. A method comprising:
generating, at a device, an encoded representation of an audio signal that includes a target speech and one or more interference signals, the audio signal being provided by one or more microphones of the device responsive to sound from a target speaker;
determining, at the device, masks used to jointly estimate the target speech and one or more target audio parameters of the target speech based on the encoded representation;
determining, at the device, joint estimates of the target speech and the one or more target audio parameters, the joint estimates being extracted from the interference signals by applying the masks to the encoded representation of the audio signal;
generating, at the device, an enhanced signal of the target speech based on the joint estimates; and
generating, at the device, the one or more target audio parameters of the target speech based on the joint estimates.

2. The method of claim 1, wherein generating the encoded representation of the audio signal comprises a machine learning network mapping the audio signal into a feature space that is used to jointly estimate the target speech and the one or more target audio parameters from the audio signal.

3. The method of claim 1, wherein determining the masks comprises a machine learning network jointly reducing cost functions associated with estimating the target speech and estimating the one or more target audio parameters.

4. The method of claim 1, wherein the masks are used to filter the encoded representation of the audio signal to generate masked features of the target speech and the one or more target audio parameters.

5. The method of claim 4, wherein generating the enhanced signal of the target speech based on the joint estimates comprises a machine learning network mapping the masked features of the target speech to the enhanced signal as a time-domain waveform.

6. The method of claim 1, further comprising:
training a machine learning network to jointly learn characteristics of the target speech and the one or more target audio signals.

7. The method of claim 1, wherein the target audio parameters comprise a voice activity detection of the target speech.

8. The method of claim 1, further comprising:
receiving visual signals that include visual information of the target speaker captured by a camera of the device;
mapping the visual signals into a feature space; and
augmenting the encoded representation of the audio signal with the feature space mapped from the visual signals.

9. The method of claim 1, wherein the one or more microphones comprise an array of microphones of the device, wherein the audio signal comprises multiple channels of audio signals provided by the array of microphones, and wherein the encoded representation of the audio signal maps the audio signal into a feature space that includes spatial features of the target speech.

10. The method of claim 1, wherein the device comprises a time-domain deep neural network (DNN).

11. A device comprising:
a processor; and
a memory coupled to the processor to store instructions, which when executed by the processor, cause the processor to implement a machine learning model to:
generate an encoded representation of an audio signal that includes target speech and one or more interference signals, the audio signal being provided by one or more microphones of the device responsive to sound from a target speaker;
determine masks used to jointly estimate the target speech and one or more target audio parameters of the target speech based on the encoded representation;
estimate joint estimates of the target speech and the one or more target audio parameters, the joint estimates being extracted from the interference signals by applications of the masks to the encoded representation of the audio signal;
generate an enhanced signal of the target speech based on the joint estimates; and
generate the one or more target audio parameters of the target speech based on the joint estimates.

12. The device of claim 11, wherein to generate the encoded representation of the audio signal, the processor further executes the instructions stored in the memory to implement the machine learning model to map the audio signal into a feature space that is used to jointly estimate the target speech and the one or more target audio parameters from the audio signal.

13. The device of claim 11, wherein to determine the mask, the processor further executes the instructions stored in the memory to implement the machine learning model to jointly reduce cost functions associated with the joint estimates of the target speech and the one or more target audio parameters.

14. The device of claim 11, wherein the masks are used to filter the encoded representation of the audio signal to generate masked features of the target speech and the one or more target audio parameters.

15. The device of claim 11, wherein the processor further executes the instructions stored in the memory to:
train the machine learning model to jointly learn characteristics of the target speech and the one or more target audio signals.

16. The device of claim 11, wherein the target audio parameters comprise a voice activity detection of the target speech.

17. The device of claim 11, wherein the processor further executes the instructions stored in the memory to implement the machine learning model to:
receive visual signals that include visual information of the target speaker captured by a camera of the device;
map the visual signals into a feature space; and
augment the encoded representation of the audio signal with the feature space mapped from the visual signals.

18. The device of claim 11, wherein the one or more microphones comprise an array of microphones of the device, wherein the audio signal comprises multiple channels of audio signals provided by the array of microphones, and wherein the encoded representation of the audio signal maps the audio signal into a feature space that includes spatial features of the target speech.

19. The device of claim 11, wherein the machine learning model comprises a time-domain deep neural network (DNN).

20. A non-transitory computer-readable medium having instructions stored therein, which when executed by a processor, cause the processor to perform operations using a machine learning network, the operations comprising:
generating an encoded representation of an audio signal that includes target speech from a target speaker and one or more interference signals, the audio signal being provided by one or more microphones of a device responsive to sound from the target speaker;

determining masks used to jointly estimate the target speech and one or more target audio parameters of the target speech based on the encoded representation;

determining joint estimates of the target speech and the one or more target audio parameters, the joint estimates being extracted from the interference signals by applying the masks to the encoded representation of the audio signal;

generating an enhanced signal of the target speech based on the joint estimates; and generating the one or more target audio parameters of the target speech based on the joint estimates.

* * * * *